C. CLAUSEN.
MINE CAR WHEEL.
APPLICATION FILED APR. 19, 1916.
1,190,111.
Patented July 4, 1916.
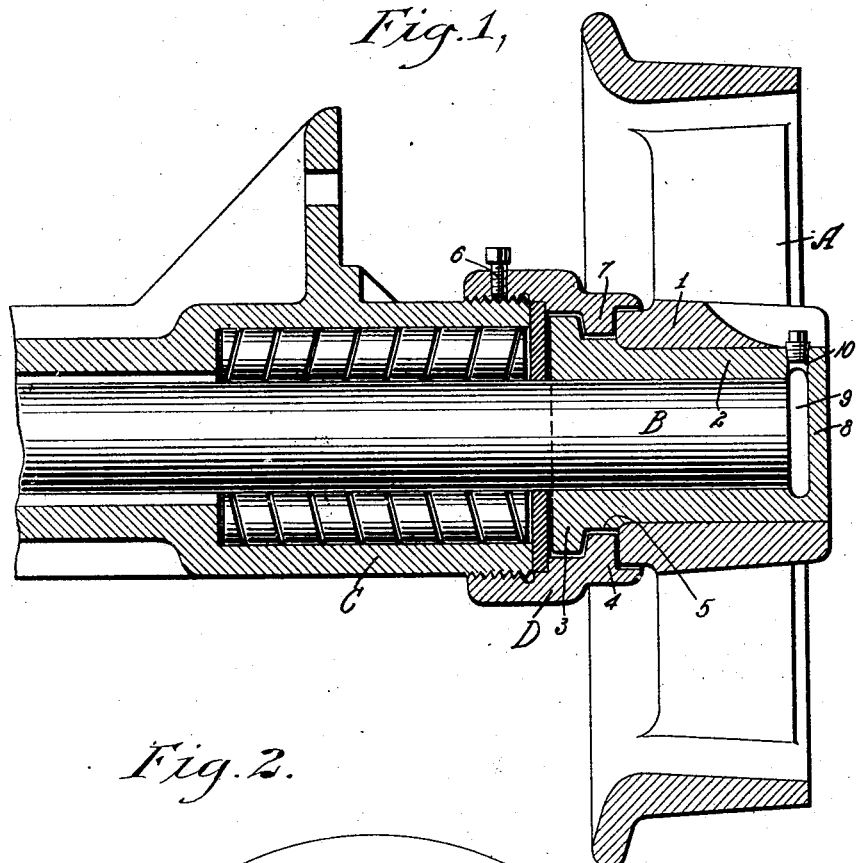
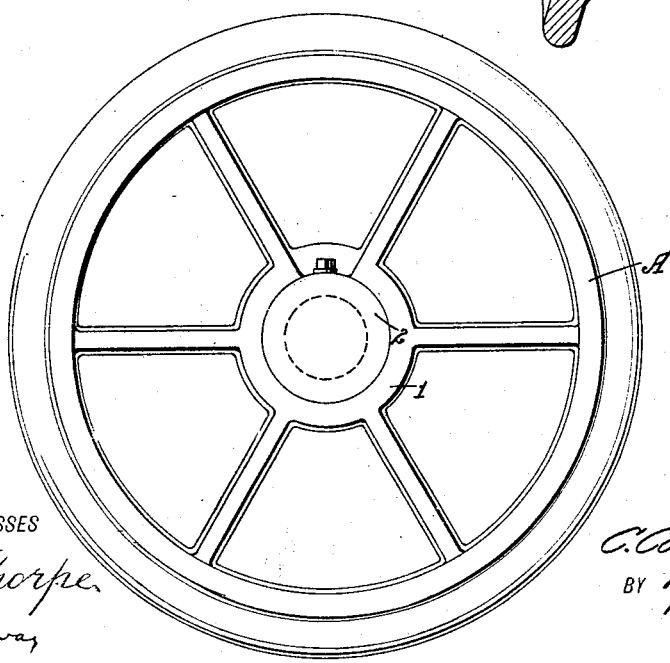
WITNESSES
INVENTOR
ATTORNEYS

UNITED STATES PATENT OFFICE.

CARL CLAUSEN, OF BISBEE, ARIZONA.

MINE-CAR WHEEL.

1,190,111. Specification of Letters Patent. Patented July 4, 1916.

Application filed April 19, 1916. Serial No. 92,172.

*To all whom it may concern:*

Be it known that I, CARL CLAUSEN, a citizen of the United States, and a resident of Bisbee, in the county of Cochise and State of Arizona, have invented a new and Improved Mine-Car Wheel, of which the following is a full, clear, and exact description.

This invention relates to mine cars, and more particularly to wheels therefor.

The invention has for its general objects to improve the construction of wheels, whereby one wheel on an axle will be loose for permitting the two wheels to have differential movement for freely passing around a curve in the track, the wheel being preferably cast of manganese steel and provided with a bushing which is forced or driven into the hub portion of the wheel and which freely rotates on the axle, there being a special formation whereby the bushing is engaged with a retaining ring or collar fastened to the axle bearing, whereby the wheel can be removably applied to the axle.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in both the views, Figure 1 is a sectional view of the wheel and associated parts; and Fig. 2 is a side view of the wheel.

Referring to the drawing, A designates the car wheel, B the axle, C the bearing therefor, and D the wheel-retaining ring.

The wheel A in the present instance is supposed to be cast of manganese steel, which metal is too hard to admit of the bore of the hub being finished in such a manner as to have a rotating contact with the axle B, and therefore, in the hub 1 of the wheel is disposed a brass, bronze or other bushing 2 of such shape and size as to have a forced fit in the hub, making the bushing and wheel a permanently united unitary structure. This bushing has its bore carefully machined so as to fit the axle on which the wheel rotates. The inner end of the bushing is slightly larger in diameter than the bore of the hub so as to form a shoulder against which the hub engages when the bushing is driven into the hub, and beyond this enlarged portion is an annular flange 3 which coöperates with the end 4 of the hub to form an annular groove 5. The retaining ring D is screwed on and encircles the bearing C and is held in position by a set screw or equivalent means 6. The retaining ring projects over the inner end of the bushing and has an internal annular flange or the equivalent 7 which engages in the annular groove 5, whereby the wheel A and the bushing are retained on the axle. The retaining ring if made in one piece is applied to the bushing before the same is driven into the wheel, and the wheel is fastened in place by screwing the retaining ring on the bearing with the end of the axle projecting into the bushing 2. The outer end 8 of the bushing is closed and a chamber 9 is formed between the closed end of the bushing and the axle to contain lubricant, which is supplied through a normally plugged opening 10 in the bushing.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of an axle, a bearing therefor, a retaining ring removably fastened to the bearing and having an internal flange, a wheel, and a bushing fastened in the hub of the wheel and having an annular groove on its inner end with which the flange of the retaining ring engages to rotatably hold the wheel and bushing on the axle.

2. The combination of a wheel, a bushing fastened in the hub thereof and having an end extending from one end thereof, said extending end being formed with a circumferential groove, an axle extending into the bushing, a bearing for the axle, and a ring screwed on the outside of the bearing and embracing the projecting end of the bushing and formed with an internal annular flange engaging in the groove of the bushing to rotatably retain the latter and wheel on the axle.

In testimony whereof I have signed my name to this specification in the presence of two subscribing witnesses.

CARL CLAUSEN.

Witnesses:
L. C. SHALLUTH,
ERNEST J. BEYER.

Copies of this patent may be obtained for five cents each, by addressing the "Commissioner of Patents, Washington, D. C."